Figure 1:
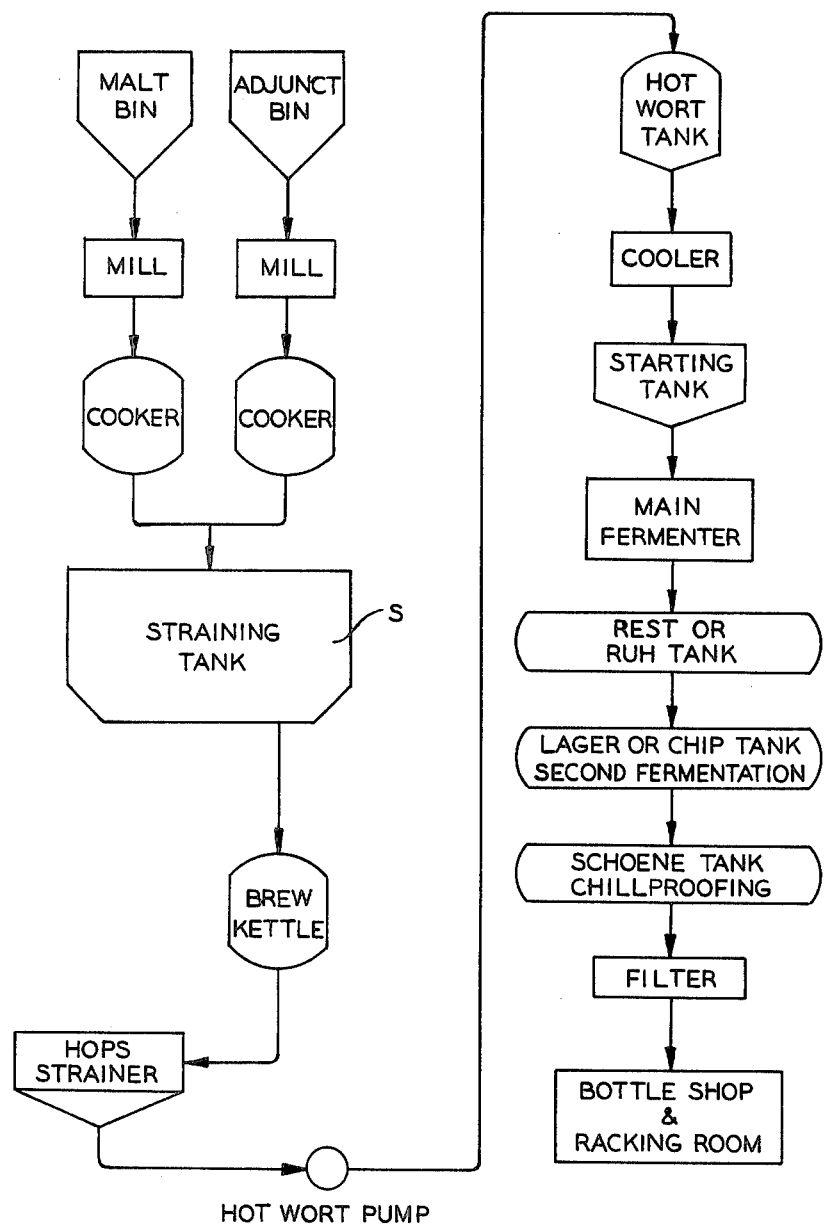

United States Patent [19]

Chyba et al.

[11] 4,197,321

[45] Apr. 8, 1980

[54] PROCESS FOR BREWING BEER AND TREATING SPENT GRAINS

[75] Inventors: Gustav W. Chyba, Davis, Calif.; John H. Dokos, St. Louis County, Mo.

[73] Assignee: Anheuser-Busch, Incorporated, St. Louis, Mo.

[21] Appl. No.: 893,048

[22] Filed: Apr. 3, 1978

[51] Int. Cl.² ............................................. C12C 11/00
[52] U.S. Cl. ........................................ 426/11; 426/16; 426/29; 426/31; 426/416; 426/436; 426/478; 426/489; 426/507; 426/624
[58] Field of Search ....................... 426/11, 16, 28, 29, 426/31, 436, 478, 489, 507, 592, 618, 624, 416, 629; 210/73 R, 78

[56] References Cited

U.S. PATENT DOCUMENTS

| | | | |
|---|---|---|---|
| 2,936,236 | 5/1960 | Schwaiger et al. | 426/436 |
| 3,212,902 | 10/1965 | Bavisotto | 426/31 |
| 3,993,791 | 11/1976 | Breed et al. | 426/436 |

OTHER PUBLICATIONS

De Clerck, "A Textbook of Brewing", vol. I (1957), pp. 285, 294–301.

*Primary Examiner*—S. Leon Bashore
*Assistant Examiner*—Peter Chin
*Attorney, Agent, or Firm*—Gravely, Lieder & Woodruff

[57] ABSTRACT

In the brewing of beer, spent grain at about 90% moisture from a straining tank having no internal rotating rake is collected and pumped to a centrifuge which reduces the moisture of the spent grain to about 70% and provides spent grain liquor of about 2.0 to 4.5% or more of total solids. The spent grain liquor is stored in a tank at 165° F. to 170° F. and held until it is used up to 50% of the sparge liquid for a subsequent brew in the straining tank. The spent grains at about 70% moisture are directed to a large holding tank. Nutritious brewery waste streams are added thereby increasing the nutritional value.

2 Claims, 3 Drawing Figures

PROCESS FOR BREWING BEER AND TREATING SPENT GRAINS

This invention relates to an improved method of of operating a straining tank of the type shown in U.S. Pat. No. 2,916,421 granted Dec. 8, 1959 and 2,936,236 granted May 10, 1960. These patents relate to one type of straining tank used in the brewing industry to remove extract from brewers grains. The present invention is an improvement in the method of operation of said patented straining tanks, which have no rotating rakes therein and have no movable parts therein for contacting the grain. With the aforesaid patented straining tanks, about 16 brews per day per brewing unit became possible. The average brew time was 87 minutes, of which 10 minutes were for the "mash off," 67 minutes to complete the draw off of wort including sparges and 10 minutes for the grain-off operation. With this patented method of straining, the grains removed from the straining tank are from about 87% to 90% moisture, which is about 5 to 10% wetter than the previous lauter tub operation. With this moisture content the spect grains are pumpable.

Prior to said patented straining tanks, large and expensive lauter tubs were used with power driven rakes therein to agitate and loosen the grains. When these older lauter tubs there could be only about 10 to 12 brews per day, with possibly 14 brews per day in some situations. The spent grains had a moisture content of about 80-85%. The spent grain liquor had a total solids content of about 2-4%.

One of the principal objects of the present invention is to increase the efficiency of the extraction of soluble substances from material within a straining tank. Another object is to provide a use for the spent liquor which contains a small amount of solids by using said liquor under controlled conditions for the sparge liquid for a subsequent brew. A further object of the invention is to provide grains from a straining tank which are treated to be in usable form with a water content of 70% to 81% for feeding "as is" or "wet" to beef and dairy cattle.

Another object of the present invention is to provide a use for the spent grain liquor so that the dumping or sewage loads are not exceeded and ecology standards are maintained. Another object is to provide a simple process in which grains from a straining tank are treated so that they can be sold as cattle feed.

These and other objects and advantages will become apparent hereinafter.

The invention comprises an improved method of operating a straining tank having no rotating rake therein wherein the spent grains are removed from said straining tank in pumpable condition and are pumped to a centrifuge to separate some spent grain liquor therefrom, which spent grain liquor is collected and maintained under controlled temperature conditions and introduced into the straining tank as sparge liquid in the next subsequent brew. The spent grains are removed from the centrifuge in a screw conveyor to which nutritious waste streams from the process for brewing beer are added.

The invention further consists in the processes hereinafter described and claimed.

Figure 2:
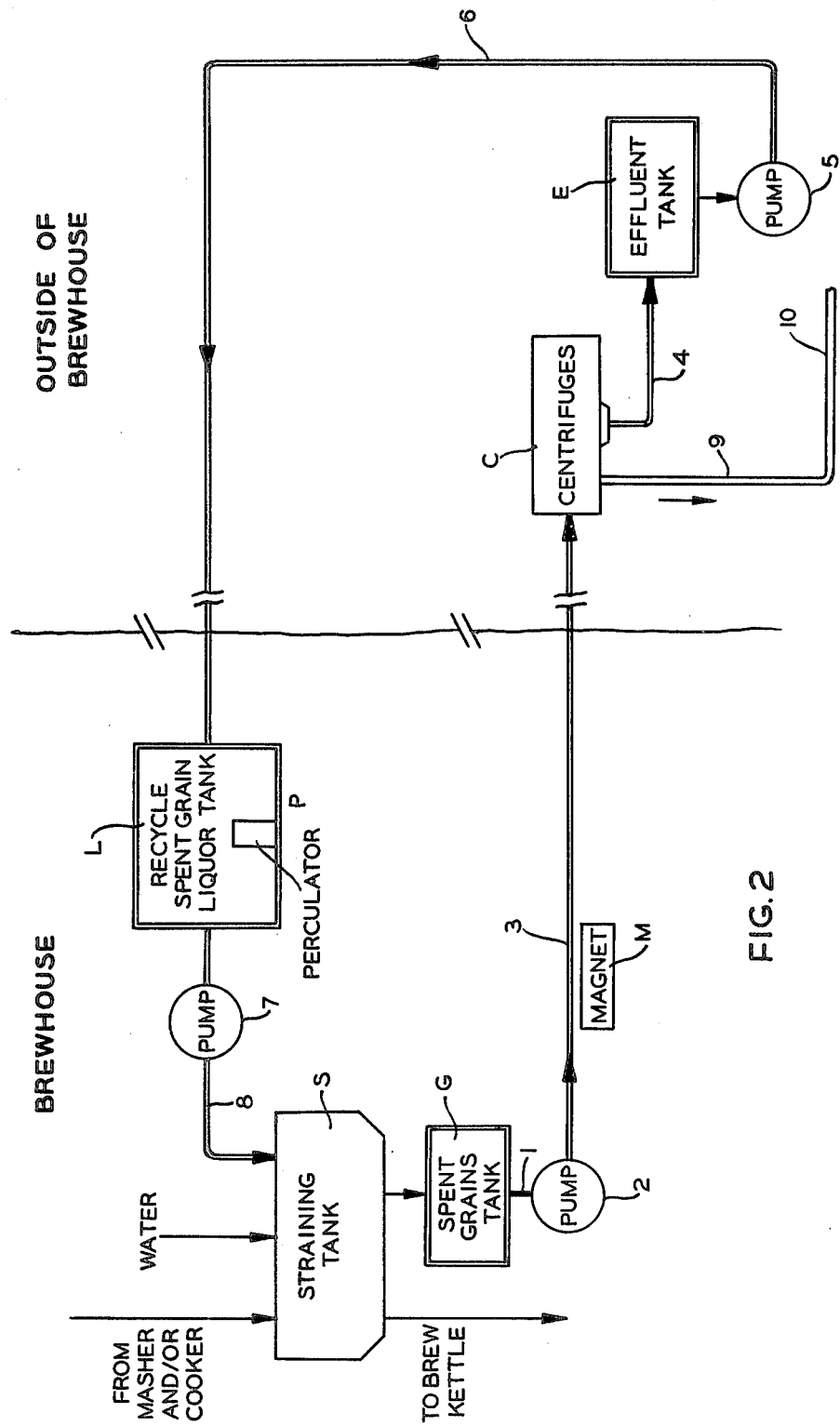
Figure 3:
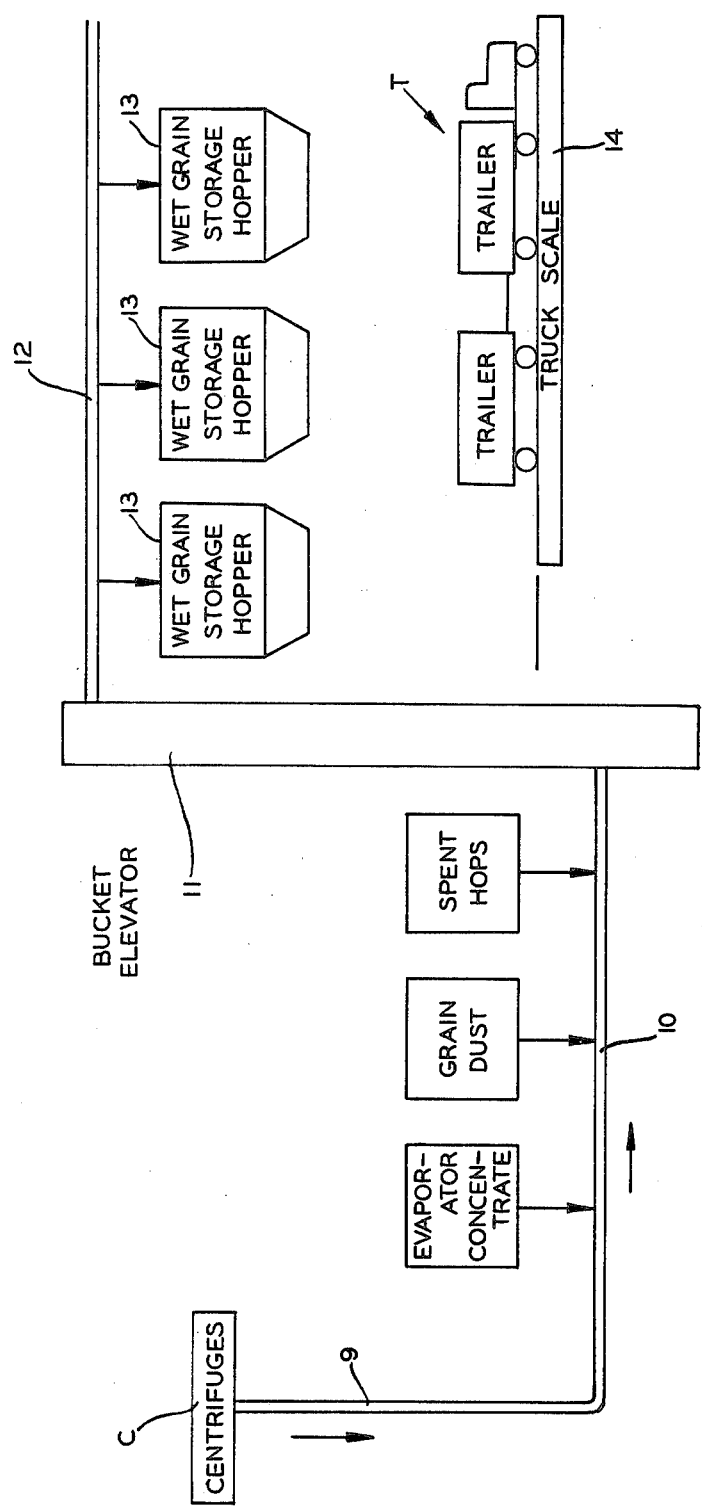

In the accompanying drawings which form part of this specification and wherein like numerals and symbols refer to like parts wherever they occur:

FIG. 1 is a partial beer production flow diagram showing the location of the straining tank in a process for brewing beer, FIG. 2 is a more detailed view regarding the straining tank and the treatment and use of spent grain liquor as sparge liquid for a subsequent brew, and FIG. 3 is a diagrammatic view of the treatment of the spent grains after the spent grains have been removed from the straining tank.

Referring now to the drawings in detail, it will be seen that the invention is embodied in a process and in portions thereof utilizing a straining tank of the type which has no rotating rake and no moving parts therein. This type of straining tank is disclosed in the aforementioned patents as is the normal operation of said straining tank wherein nothing which is removed therefrom is reintroduced into said straining tank. FIG. 1 shows such a straining tank S in a partial beer production flow diagram. The present invention includes a process for treating spent grains, collecting the spent grain liquor under controlled conditions, and then reintroducing said liquor as part of the sparge liquid of the next subsequent brew. This increases the efficiency of the straining tank and increases the amount of extract and the extract recovery rates within the straining tank. The purpose of the straining tank is to remove the soluble substances from grains.

Referring to FIG. 2, the straining tank S is shown in diagrammatic form. At present, such straining tanks can be used for wort production up to about 16 brews per day per brewing unit. The average occupation time of the grain within the straining tank per brew is about 87 minutes, of which 10 minutes are used for the mash-off, 67 minutes for the complete draw-off of wort including sparges, and 10 minutes for the grain-out or removal of the grain from the straining tank. Actually, the grains are removed through large doors at the bottom of the straining tank within about 2 or 3 minutes, but water for flushing out those grains which remain requires the additional portion of the 10 minute period.

In normal operation of a 16 brew per day cycle, the spent grains have about 90% moisture, which is about 5 to 10% wetter than the previous lauter tub operation which utilizes a rotating rake therein. The increased moisture content renders spent grains more spoilable, more difficult to handle, much more expensive to dry, and incapable of being dumped into the sewer because of the present legal limits imposed by ecology considerations. In addition, the extract recovery rates may be lower at times depending upon the raw materials used and the mashing process applied.

The present invention eliminates the foregoing disadvantages and yields spent grains of only 70% to 81% moisture, which is highly desirable for the feeding of spent grains "as is" or "wet" to dairy or beef cattle. In addition, the process eliminates the need to great the spent grain liquor either by drying it, or if legally and technically permissible, by paying surcharges for extra sewage loads. The extra sewage loads may not be permitted because of local restrictions on B.O.D. and suspended solids in effluence and drying facilities or fuel may not be available or may be uneconomical.

The spent grains are removed from the straining tank S anf fall into a spent grains tank G whose capacity is sufficient to receive all of the grains and water from the flushing out of the grains. At this point the spent grains are subject to microbiological spoilage, so the spent grains tank G is insulated to prevent cooling.

From the spent grains tank G, the spent grains are pumped through a conduit 1 to a pump 2 which pumps the spent grains through an insulated conduit 3 which is provided with a magnet M for removing metal which might be in the spent grains. The spent grains tank G, the pump 2, and magnet M are located in the brewhouse. However, the insulated conduit 3 extends for a great distance to another building where the remaining equipment can be located. The conduit 3 leads to two centrifuges C, which are not insulated. The centrifuges used are called the Sharples Super-D-Canter brand, but others may be satisfactory. The capacity of the centrifuges C must permit the processing of each batch of spent grains from one brew in time to permit intermittent sterilization. The centrifuges C reduce the moisture in the spent grains and separate the spent grain liquor from the spent grains.

Upon leaving the centrifuges C, the spent grains have about 70% moisture (plus or minus about 2%). The spent grain liquor flows from the centrifuges C by gravity and has 2.0 to 4.5% or more of total solids, of which 0.2 to 0.7% is the insoluble portion depending upon the centrifuge load and accumulative effects. The spent grain liquor has a pH from 6.0 to 6.5, depending upon the brewing water composition and solid concentration.

The spent grain liquor flows through a conduit 4 and is collected in a buffer tank or effluent tank E to keep a head on a pump 5 located in a different building from the brewhouse. The spent grain liquor is pumped through an insulated conduit 6 into a large collection tank L for the recycled spent grain liquor. The tank L is located in the brewhouse, contains a percolator P, is insulated and is of such size as to hold up to 50% of the total sparge volume required for the next subsequent brew in the straining tank S. The percolator P in the tank L maintains the temperature of the spent grain liquor at about 165° F. to 170° F., which is the required temperature of the sparge liquid and which prevents microbiological spoilage within said liquor. A pump 7 and insulated conduit 8 are provided to force the spent grain liquor into the straining tank S from the tank L at the proper time, as will be explained hereinafter. Referring to FIG. 2, all conduits 1, 3, 4, 6, and 8 are insulated, and conduit 6 may be traced with steam piping. All tanks G, E, and L are insulated so that the spent grain liquor is always maintained at the proper temperature of 165° F. to 170° F. The centrifuges C, tank E, pump 5, and conduits 4 and 6 may be located outside of the brewhouse.

While spent liquor has previously been utilized in other ways in the brewing process and in spent grains, it is novel to treat and collect said grain liquor and use said treated liquor as a substantial portion of the sparge liquid of the next subsequent brew. This is accomplished by moving the liquor from the large collection tank L through an insulated conduit 8 to the straining tank S. The large collection tank L is located near the straining tank S, since the liquor is not very stable. This is why its temperature must be maintained at about 165° F. to 170° F.

There is sanitary design of all tanks, pipes, centrifuges, and associated equipment as well as hot water flushes between individual batches in order to provide an aseptic environment and to prevent microbiological spoilage. One batch of the spent grain liquor is used in its entirety within one mash-cycle in order to minimize chemical decomposition with its possible negative effect on resulting beer flavor.

In operation and referring to FIG. 2, it will be seen that grain from the masher or cooker, water, and recycled spent grain liquor are added to the straining tank S. The uninsulated straining tank has a capacity of about 450 barrels. To load the straining tank S and utilize the invention herein, about 250 barrels of grain from the cooker are run into the straining tank, after which about 100 barrels of water at 165° F. to 170° F. are injected into the straining tank S to form a filter mass around the tubes within the straining tank S. Up to 220 barrels of recycled spent grain liquor are then injected into the straining tank S, followed by about 100 barrels of water at 165° F. to 170° F. In this manner, it has been found that there is more efficient utilization of solubles and extraction of solubles from the grain which was just received by the straining tank S from the cooker.

As to the spent grains which leave the centrifuge with about 70% moisture, said spent grains drop in a chute 9 or other means. If desired, they enter a large final storage tank or spent grains holding tanks, which hold one full day's production. Referring now to FIG. 3, a screw conveyor 10 or similar device continuously circulates and mixes the spent grains. Brewery waste streams are prorated into the screw conveyor 10, which may increase the water content of the grains slightly. Spent grains of 81% moisture are manageable for feeding to beef and dairy cattle and can be sold directly to farmers and cattle feeders. The brewery waste streams which may be added to the spent grains include spent hops, the Schoene bottom from the chillproofing process, chip yeast from aging tanks or tank yields, alpha yeast from fermenters, grain dust from suction lines and the grain handling system, and rejected spent grain liquor. FIG. 3 shows diagrammatic hoppers or tanks for the evaporator concentrate, grain dust, and spent hops, but additional tanks are used as needed for storage until said products can be fed into the conveyor 10 and mixed with the spent grains.

The screw conveyor 10 extends from the centrifuge and feeds mixed grain and brewery waste streams onto a pocket elevator 11 which raises the elevation of the mixture to a hopper loader conveyor 12 which directs the mixture onto several wet grain storage hoppers 13. The hoppers 13 are in an elevated position so that a truck T can drive beneath said hoppers 13 and onto a truck scale 14 so that the truck T can be efficiently loaded by gravity to the desired weight. After sufficient mixed wet grain has been loaded from the hopper onto the truck T and weighed, the truck T is moved so that another truck can receive wet grain from the hoppers 13.

In a brewery of about 3.7 million barrel capacity, there are each day about 147.6 tons of spent grains at 70% moisture, about 54.4 tons of non-recyclable spent grain liquor at about 98% moisture, about 51.2 tons of trub at 92% moisture, about 0.6 tons of grain dust at 6% moisture, about 5.6 tons of spent hops at 85% moisture, about 51 tons of waste yeast and tank bottoms at 82.5% to 94.0% moisture. When the waste streams are added to the spent grains of about 70% moisture, the latter moisture content may be increased somewhat. Since these waste streams become part of the spent grains which are sold "wet" or "as is," additional sewage loads are eliminated or lessened. If this process is not used and if waste streams have to be treated because of ecology restrictions, the present process saves capital investment for dryers, and associated equipment, as well as the continuous fuel and operating expense.

This invention is intended to cover all changes and modifications of the example of the invention herein chosen for purposes of the disclosure, which do not constitute departures from the spirit and scope of the invention.

What is claimed is:

1. In a process for brewing beer utilizing a straining tank having no internal rotating rake, said process utilizing spent grains from said straining tank, comprising the steps of:
   A. removing spent grains from a straining tank, said spent grains having a moisture content of about 90% and being in a pumpable condition,
   B. pumping said spent grains to a centrifuge,
   C. maintaining said spent grains at a substantially constant temperature from said straining tank to said centrifuge,
   D. separating spent grain liquor from said spent grains in said centrifuge to reduce the moisture content of said grains to about 70% and to produce said spent grain liquor,
   E. collecting said spent grain liquor in an insulated buffer tank,
   F. said spent grain liquor having a solids content of about 2.0% to 4.5% total solids,
   G. pumping said spent grain liquor from said buffer tank in an insulated pipe to an insulated large collection tank,
   H. collecting said spent grain liquor in said collection tank until about one-third to one-half of the quantity of sparge liquid required for the next brew in the straining tank is in said collection tank,
   I. maintaining said spent grain liquor in said collection tank at a temperature of about 165° F. to 170° F., and
   J. introducing said spent grain liquor into the straining tank as sparge liquid into the next subsequent brew.

2. In a process for brewing beer utilizing a straining tank having no internal rotating rake, said process utilizing spent grains from said straining tank, comprising the steps of:
   A. removing spent grains from a straining tank, said spent grains having a high moisture content so as to be in a pumpable condition,
   B. pumping said spent grains to a centrifuge,
   C. maintaining said spent grains at a substantially constant temperature from said straining tank to said centrifuge,
   D. separating spent grain liquor from said spent grains in said centrifuge to reduce the moisture content of said grains to about 70% and to produce said spent grain liquor,
   E. transporting said spent grains in a conveyor to a final storage tank,
   F. adding nutritious waste streams from the process for brewing beer to said spent grains,
   G. collecting said spent grain liquor from said buffer tank in an insulated buffer tank,
   H. said spent grain liquor having a solids content of about 2.0% to 4.5% total solids,
   I. pumping said spent grain liquor in an insulated pipe to an insulated large collection tank,
   J. collecting said spent grain liquor in said collection tank until about one-third to one-half of the quantity of sparge liquid required for the next brew in the straining tank is in said collection tank,
   K. maintaining said spent grain liquor in said collection tank at a temperature of about 165° F. to 170° F., and
   L. introducing said spent grain liquor into the straining tank as sparge liquid into the next subsequent brew.

* * * * *